United States Patent  
Nose et al.

(10) Patent No.: US 12,485,757 B2
(45) Date of Patent: Dec. 2, 2025

(54) VEHICLE CONTROL DEVICE, VEHICLE CONTROL METHOD, AND NON-TRANSITORY RECORDING MEDIUM

(71) Applicant: TOYOTA JIDOSHA KABUSHIKI KAISHA, Toyota (JP)

(72) Inventors: Masashi Nose, Nagoya (JP); Tomoaki Miyazawa, Nagoya (JP); Kazuya Kumazawa, Nagoya (JP); Miki Tsujino, Nagakute (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 18/499,452

(22) Filed: Nov. 1, 2023

(65) Prior Publication Data

US 2024/0182060 A1 Jun. 6, 2024

(30) Foreign Application Priority Data

Dec. 1, 2022 (JP) .................................. 2022-193117

(51) Int. Cl.
*B60K 35/29* (2024.01)
*B60W 30/18* (2012.01)
*B60W 50/14* (2020.01)
*B60K 35/28* (2024.01)

(52) U.S. Cl.
CPC ....... *B60K 35/29* (2024.01); *B60W 30/18163* (2013.01); *B60W 50/14* (2013.01); *B60K 35/28* (2024.01); *B60K 2360/176* (2024.01); *B60K 2360/1868* (2024.01); *B60K 2360/188* (2024.01); *B60W 2050/146* (2013.01)

(58) Field of Classification Search
CPC ........... B60W 50/14; B60W 30/18163; B60W 2050/146; B60K 35/00; B60K 35/28; B60K 2360/1868; B60K 2360/176; B60K 35/29; B60K 2360/188
USPC ........................................................ 340/438
See application file for complete search history.

(56) References Cited

U.S. PATENT DOCUMENTS

| | | | |
|---|---|---|---|
| 9,410,818 B2* | 8/2016 | Takimoto | G01C 21/3644 |
| 9,878,667 B2* | 1/2018 | Iguchi | G02B 27/0101 |
| 2012/0130561 A1* | 5/2012 | Chiang | G08G 1/165 701/1 |
| 2016/0069702 A1* | 3/2016 | Takimoto | G01C 21/3644 701/519 |

(Continued)

FOREIGN PATENT DOCUMENTS

| | | |
|---|---|---|
| JP | 2005-207999 A | 8/2005 |
| JP | 2006-129839 A | 6/2008 |

(Continued)

*Primary Examiner* — Zhen Y Wu
(74) *Attorney, Agent, or Firm* — Oblon, McClelland, Maier & Neustadt, L.L.P.

(57) ABSTRACT

A vehicle control device includes a processor installed at a vehicle configured to execute driving assistance control. The processor is configured to cause display of an other-vehicle image generated based on surrounding information including information related to at least one other-vehicle traveling in surroundings of the vehicle, at a display device provided at the vehicle. The other-vehicle image represents the other-vehicle with a same color as that of the other-vehicle.

6 Claims, 8 Drawing Sheets

(56) References Cited

U.S. PATENT DOCUMENTS

| | | | |
|---|---|---|---|
| 2016/0121794 A1* | 5/2016 | Iguchi | B60K 35/235 |
| | | | 345/7 |
| 2018/0065552 A1* | 3/2018 | Mori | B60Q 9/00 |
| 2020/0219398 A1* | 7/2020 | Shimizu | G08G 1/16 |
| 2021/0261146 A1* | 8/2021 | Inoue | G10L 15/22 |
| 2023/0182764 A1* | 6/2023 | Fukui | G06F 3/147 |
| | | | 345/660 |
| 2023/0184560 A1* | 6/2023 | Che | G01C 21/3638 |
| | | | 701/436 |

FOREIGN PATENT DOCUMENTS

| | | |
|---|---|---|
| JP | 2017-52706 A | 3/2017 |
| WO | WO2019/038903 A1 | 2/2019 |
| WO | WO-2022/030372 A1 | 2/2022 |

\* cited by examiner

VEHICLE CONTROL DEVICE, VEHICLE CONTROL METHOD, AND NON-TRANSITORY RECORDING MEDIUM

CROSS-REFERENCE TO RELATED APPLICATION

This application is based on and claims priority under 35 USC 119 from Japanese Patent Application No. 2022-193117 filed on Dec. 1, 2022, the disclosure of which is incorporated by reference herein.

BACKGROUND

Technical Field

The present disclosure relates to a vehicle control device, a vehicle control method, and a non-transitory recording medium.

Related Art

A vehicle disclosed in International Publication (WO) No. 2019/038903 includes a display device capable of displaying a highway image representing a highway the vehicle is traveling on and an other-vehicle image representing an other-vehicle at a position in the surroundings of the vehicle. The display device is furthermore able to display the highway image and the other-vehicle image in two types of display mode. Namely, the display modes of the display device include a first mode that is a display mode prior to the vehicle executing lane change assist control (LCA), and a second mode that is a display mode while the vehicle is executing LCA.

The form of the other-vehicle image displayed in the second mode is designed without consideration to the actual form of the other-vehicle. There is accordingly a concern that an occupant of the vehicle who has looked at the display device during LCA execution might perceive a mismatch between the surrounding situation of the vehicle, as expressed by the highway image and the other-vehicle image displayed on the display device, and the actual surrounding situation.

In consideration of the above circumstances, an object of the present disclosure is to obtain a vehicle control device, a vehicle control method, and a non-transitory recording medium that make it unlikely that an occupant who has looked at the display device during execution of driving assistance control would perceive a mismatch between the surrounding situation of the vehicle, as expressed by an image being displayed on a display device, and the actual surrounding situation.

SUMMARY

A vehicle control device of a first aspect includes a processor installed at a vehicle configured to execute driving assistance control. The processor is configured to cause display of an other-vehicle image generated based on surrounding information including information related to at least one other-vehicle traveling in surroundings of the vehicle, at a display device provided at the vehicle. The other-vehicle image represents the other-vehicle with a same color as that of the other-vehicle.

The processor of the vehicle control device of the first aspect is able to display on the display device the other-vehicle image representing the at least one other-vehicle traveling in the surroundings of the vehicle with the same color as the other-vehicle. The vehicle control device of the first aspect accordingly makes it unlikely that an occupant who has looked at the display device during execution of driving assistance control would perceive a mismatch between the surrounding situation of the vehicle, as expressed by the image being displayed on the display device, and the actual surrounding situation.

The vehicle control device of the second aspect is the first aspect, wherein the processor is configured to switch a color of the other-vehicle image to a same color as that of the other-vehicle in a case in which the vehicle is executing a particular type of the driving assistance control.

The processor of the vehicle control device of the second aspect switches the color of the other-vehicle image to the same color as that of the other-vehicle when the vehicle is executing the particular driving assistance control. The vehicle control device of the second aspect accordingly makes it unlikely that an occupant who has looked at the display device during execution of the particular driving assistance control would perceive a mismatch between the surrounding situation of the vehicle, as expressed by the image being displayed on the display device, and the actual surrounding situation. Furthermore, the vehicle control device of the second aspect is readily able to make the occupant aware that the particular driving assistance control is being executed.

The vehicle control device of the third aspect is the first aspect, wherein the processor is configured to cause display of the other-vehicle image with a same shape as that of the other-vehicle, at the display device, in a case in which the vehicle is executing a particular type of the driving assistance control.

The processor of the vehicle control device of the third aspect displays the other-vehicle image with the same shape as that of the at least one other-vehicle traveling in the surroundings of the vehicle on the display device when the vehicle is executing the particular driving assistance control. The vehicle control device of the third aspect accordingly makes it unlikely that an occupant who has looked at the display device during execution of the particular driving assistance control would perceive a mismatch between the surrounding situation of the vehicle, as expressed by the image being displayed on the display device, and the actual surrounding situation. Moreover, the vehicle control device of the third aspect is readily able to make the occupant aware that the particular driving assistance control is being executed.

A vehicle control device of a fourth aspect is the first aspect, wherein as the other-vehicle image, the processor is configured to cause display of a camera image acquired by a camera provided at the vehicle, at the display device, in a case in which the vehicle is executing a particular type of the driving assistance control.

The processor of the vehicle control device of the fourth aspect displays the camera image acquired by the camera provided to the vehicle as the other-vehicle image on the display device when the vehicle is executing the particular driving assistance control. This means that with the vehicle control device of the fourth aspect, there is accordingly hardly any concern that the occupant who has looked at the display device during execution of the particular driving assistance control would perceive a mismatch between the surrounding situation of the vehicle, as expressed by the camera image being displayed on the display device, and the actual surrounding situation. Moreover, the processor of the vehicle control device of the fourth aspect is readily able to make the occupant aware that the particular driving assistance control is being executed.

A vehicle control device of the fifth aspect is the fourth aspect, wherein the processor is configured to cause display of an image representing the vehicle at the display device that is displaying the camera image.

The processor of the vehicle control device of the fifth aspect displays the image representing the vehicle on the display device that is displaying the camera image. The vehicle control device of the fifth aspect is accordingly readily able to make the occupant who has looked at the display device aware of the positional relationship between the vehicle the occupant is riding in and the other-vehicle represented by the camera image being displayed on the display device.

A vehicle control method of a sixth aspect includes, by a processor, causing display of an other-vehicle image generated based on surrounding information including information related to at least one other-vehicle traveling in surroundings of a vehicle configured to execute driving assistance control, at a display device provided at the vehicle, wherein the other-vehicle image represents the other-vehicle with a same color as that of the other-vehicle.

A non-transitory recording medium of a seventh aspect is a non-transitory recording medium stores a program executable by a computer to perform processing. The processing includes: causing display of an other-vehicle image generated based on surrounding information including information related to at least one other-vehicle traveling in surroundings of a vehicle configured to execute driving assistance control, at a display device provided at the vehicle, wherein the other-vehicle image represents the other-vehicle with a same color as that of the other-vehicle.

As described above, the vehicle control device, the vehicle control method, and the non-transitory recording medium according to the present disclosure exhibit the excellent advantageous effect of making it unlikely that an occupant who has looked at the display device during execution of driving assistance control would perceive a mismatch between the surrounding situation of the vehicle, as expressed by the image being displayed on the display device, and the actual surrounding situation.

BRIEF DESCRIPTION OF THE DRAWINGS

Exemplary embodiments of the present disclosure will be described in detail based on the following figures, wherein.

DETAILED DESCRIPTION

Description follows regarding exemplary embodiments of a vehicle control device, a vehicle control method, and a non-transitory recording medium according to the present disclosure, with reference to the drawings. As appropriate in the drawings, an arrow FR indicates a vehicle front-rear direction front side, an arrow LH indicates a vehicle left-right direction left side, and an arrow UP indicates a vehicle height direction upper side.

Figure 1:
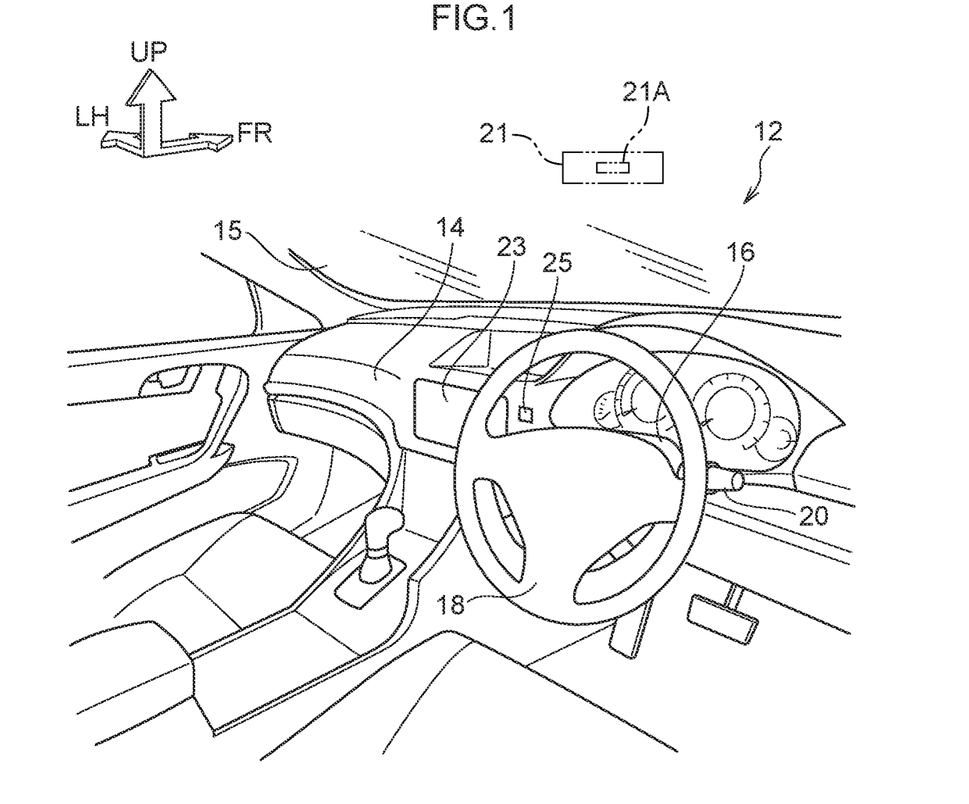
FIG. 1 is a diagram illustrating an interior of a vehicle equipped with a vehicle control device according to an exemplary embodiment.

A vehicle 12 installed with a vehicle control device 10 includes an instrument panel 14 and a front windshield 15 such as illustrated in FIG. 1. A steering column 16 is provided to the instrument panel 14, and a steering wheel 18 is supported by the steering column 16 so as to be able to rotate. Moreover, a turn signal lever 20 is supported at a right side portion of the steering column 16 so as to be able to move.

The turn signal lever 20 is able to swing about a base portion (left end portion) thereof in both an upward (counterclockwise direction) with respect to the steering column 16 and a downward (clockwise direction). The position of the turn signal lever 20 illustrated in FIG. 1 is an initial position of the turn signal lever 20. When a driver (occupant, omitted in the drawings) of the vehicle 12 imparts an external force to the turn signal lever 20, the turn signal lever 20 swings either to a left LCA operation position above the initial position, or to a right LCA operation position below the initial position (omitted in the drawings). Furthermore, when external force being imparted to the turn signal lever 20 positioned at either the left LCA operation position or the right LCA operation position is released, the turn signal lever 20 moves so as to return to the initial position automatically. The turn signal lever 20 is also able to swing between a left illumination position above the left LCA operation position and a right illumination position below the right LCA operation position.

As illustrated in FIG. 1, a sensor unit 21 is provided to an upper portion of a vehicle inside face of the front windshield 15. The sensor unit 21 includes a camera 21A that captures an imaging subject at a position in front of the front windshield 15 through the front windshield 15, a millimeter wave radar that transmits probe waves and receives reflected waves (omitted in the drawings), and a laser imaging detection and ranging (LIDAR) that scans in front of the vehicle 12 (omitted in the drawings). The vehicle 12 also includes plural cameras (omitted in the drawings) separate to the camera 21A. These cameras are collectively called a surrounding monitoring camera group.

Figure 2:
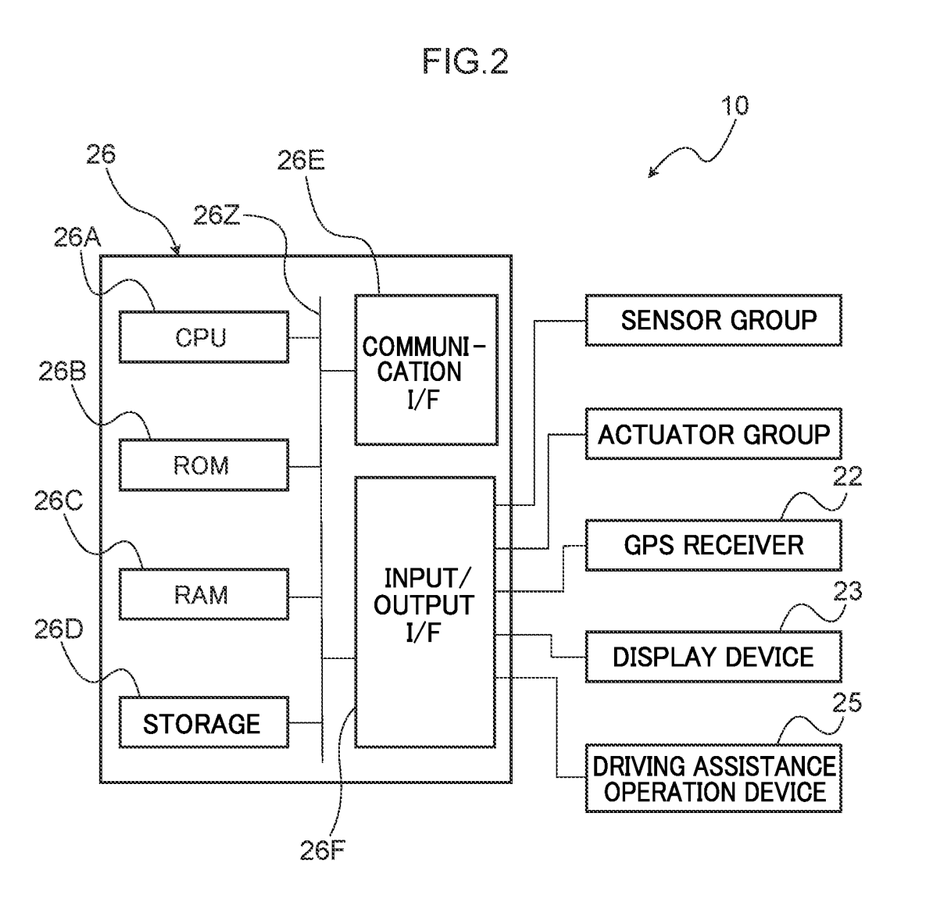
FIG. 2 is a diagram illustrating a hardware configuration of the vehicle illustrated in FIG. 1.

As illustrated in FIG. 2, the vehicle 12 includes a global positioning system (GPS) receiver 22. The GPS receiver 22 acquires information related to a position where the vehicle 12 is traveling by receiving GPS signals transmitted by GPS satellites (hereafter referred to as "location information").

As illustrated in FIG. 1 and FIG. 2, a display device 23 is provided to the instrument panel 14.

As illustrated in FIG. 1 and FIG. 2, a driving assistance operation device 25 is provided to the instrument panel 14. The driving assistance operation device 25 is a device to execute driving assistance control on the vehicle 12, as described later. The vehicle 12 is able to execute driving assistance control when the driving assistance operation device 25 is in an ON state. The vehicle 12 is not able to execute driving assistance control when the driving assistance operation device 25 is in an OFF state.

As illustrated in FIG. 2, the vehicle 12 includes an electronic control unit (ECU) 26 serving as hardware configuration.

The ECU 26 is configured including a central processing unit (CPU) (processor) (computer) 26A, read only memory (ROM) (non-transitory recording medium) (recording medium) 26B, random access memory (RAM) 26C, storage (non-transitory recording medium) (recording medium) 26D, a communication I/F 26E, and an input/output I/F 26F. The CPU 26A, the ROM 26B, the RAM 26C, the storage 26D, the communication I/F 26E, and the input/output I/F 26F are connected together through an internal bus 26Z so as to be capable of communicating with each other.

The CPU 26A is a central processing unit that executes various programs and controls each section. The CPU 26A reads a program from the ROM 26B or the storage 26D, and executes the program using the RAM 26C as workspace. The CPU 26A performs control of each configuration and various computation processing according to programs stored on the ROM 26B or the storage 26D.

The ROM 26B stores various programs and various data. The RAM 26C serves a workspace to temporarily store programs and/or data. The storage 26D is configured by a storage device such as a hard disk drive (HDD), solid state drive (SSD), or the like, and stores various programs and various data. A navigation application including map data is also, for example, installed on the ROM 26B or the storage 26D. Namely, the navigation system is installed in the vehicle 12. Furthermore, the ROM 26B or the storage 26D is also stored with first data and second data. The first data and the second data are described later.

The communication I/F 26E is an interface for connecting the ECU 26 to other ECUs (omitted in the drawings) through an external bus (omitted in the drawings). This interface employs, for example, a communication standard under a CAN protocol.

The input/output I/F 26F is an interface for communication with various devices. These devices include, for example, the camera 21A, the millimeter wave radar, the LIDAR, the surrounding monitoring camera group, the GPS receiver 22, the display device 23, the driving assistance operation device 25, and an actuator group (described later).

Figure 3:
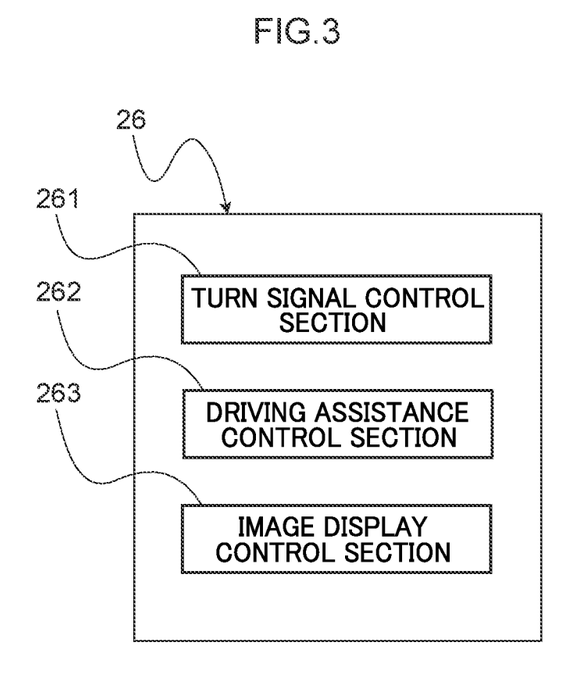
FIG. 3 is a functional block diagram of the ECU illustrated in FIG. 2.

FIG. 3 illustrates a block diagram as an example of a functional configuration of the ECU 26. The ECU 26 incudes, as functional configuration, a turn signal control section 261, a driving assistance control section 262, and an image display control section 263. The turn signal control section 261, the driving assistance control section 262, and the image display control section 263 are implemented by the CPU 26A reading and executing the program stored on the ROM 26B.

The turn signal control section 261 controls left and right turn signals (omitted in the drawings) according to the position of the turn signal lever 20. Namely, when the turn signal lever 20 is at the left LCA operation position or at the left illumination position, a left turn signal that is a lamp provided at a front end portion of the vehicle 12 is illuminated under control of the turn signal control section 261. Moreover, when the turn signal lever 20 is in the right LCA operation position or the right illumination position, the right turn signal that is a lamp provided at a front end portion of the vehicle 12 is illuminated under control of the turn signal control section 261.

When the driving assistance operation device 25 is in an ON state, the driving assistance control section 262 utilizes the sensor group and the actuator group (omitted in the drawings) provided to the vehicle 12, and executes driving assistance control on the vehicle 12 of level 1 to level 5 automation in the driving automation scale (the automated driving scale) as defined by the Society of Automotive Engineers (SAE). Moreover, when the driving assistance operation device 25 is in the ON state, a level of driving automation and driving assistance control to be executed are selectable by an action of an occupant of the vehicle 12 on the driving assistance operation device 25. The driving assistance control of the present exemplary embodiment includes, for example, adaptive cruise control (ACC), lane keeping assist control/lane tracing assist (LTA), and lane change assist control/lane change assist (LCA). The sensor group provided to the vehicle 12 includes the sensor unit 21 and the surrounding monitoring camera group. Furthermore, information acquired by the sensor group is called surrounding information. The actuator group provided to the vehicle 12 includes various electrical actuators for driving the brake system, electric power steering including the steering wheel 18, and an internal combustion engine serving as a driving source, and includes an electric motor serving as a driving source.

Simple explanation follows regarding LCA. Similarly to LTA, LCA is positional control of the vehicle 12 in a lateral direction (lane width direction) with respect to the lane of the vehicle 12. LCA is started when driving assistance control of level 1 to 3 automation has been selected and the turn signal lever 20 has been moved to either the left LCA operation position or the right LCA operation position during execution of LTA and ACC. LCA is also started when the driving assistance control section 262 has determined a need to execute a lane change when driving assistance control of level 5 automation (fully autonomous driving) has been selected and a planned travel route has been set for the vehicle 12 using the navigation system. A specific LCA execution condition is established when LCA has been started.

After LCA has been started, the CPU 26A (the driving assistance control section 262) monitors the surroundings of the vehicle 12 based on information acquired from the sensor group. The CPU 26A furthermore moves the vehicle 12 either to the left side or the right side after determination has been made that a lane change of the vehicle 12 can be executed safely. For example, when LCA is executed by the turn signal lever 20 being moved to the left LCA operation position, the actuator group is controlled so as to move the vehicle 12 from a travelling lane that is the current lane of travel of the vehicle 12 to an adjacent lane that is a lane adjacent on the left side of the travelling lane. Moreover, when LCA is executed by the turn signal lever 20 being moved to the right LCA operation position, the actuator group is controlled so as to move the vehicle 12 from the travelling lane that is the current lane of travel of the vehicle 12 to an adjacent lane that is a lane adjacent on the right side of the travelling lane. The CPU 26A (the driving assistance control section 262) ends LCA when the vehicle 12 has been moved to a specific position in the adjacent lane on the left side or the right side.

Note that the driving assistance control section 262 interrupts LCA when a specific interrupt condition is established during LCA execution. For example, the interrupt condition is established when, during LCA execution, the driving assistance control section 262 has determined that a predicted time until the vehicle 12 will collide with an other-vehicle (TTC) has become less than a specific threshold. The above LCA execution condition is broken when the interrupt condition has been established or when LCA has finished.

Figure 4:
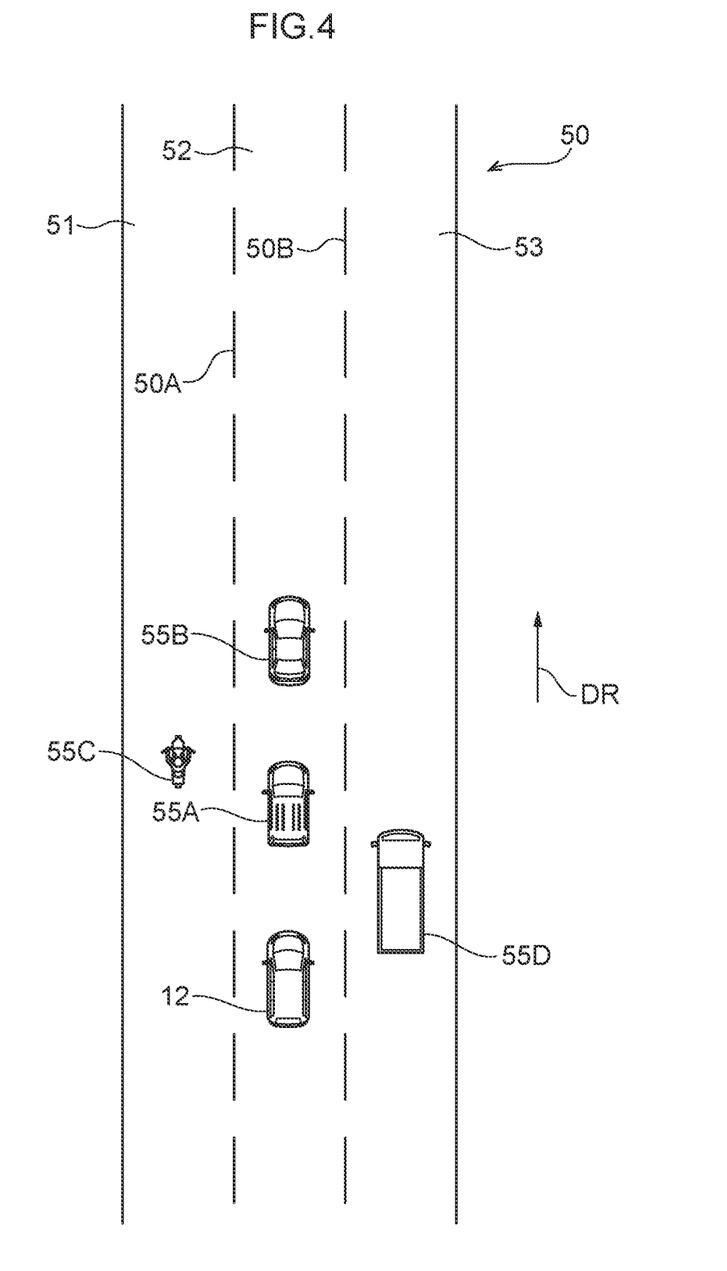
FIG. 4 is a plan view of the vehicle illustrated in FIG. 1, together with surrounding vehicles and highway.
Figure 5:
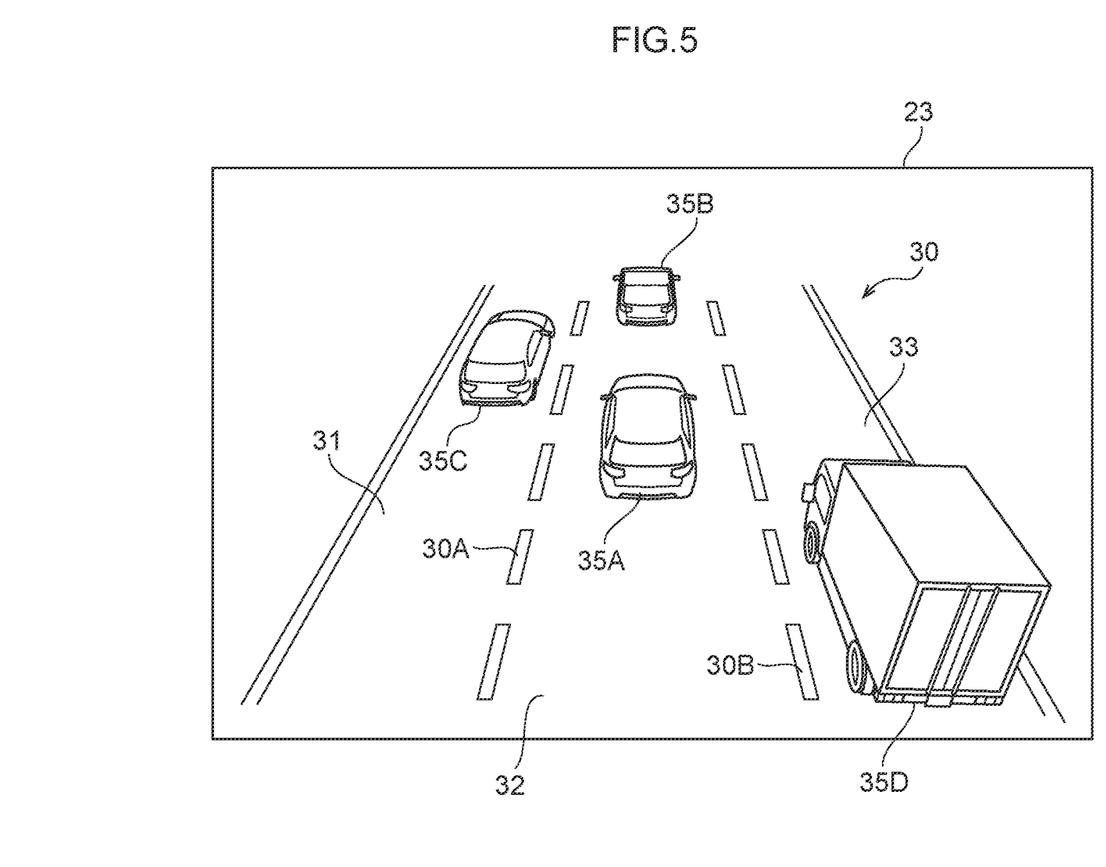
FIG. 5 is a diagram illustrating a display device displaying an image expressing a surrounding vehicle and highway when LCA is not being executed.

The image display control section 263 identifies the highway that the vehicle 12 is traveling on based on the car navigation system (map data) and location information. The image display control section 263 also reads the map data of the car navigation system and displays, on the display device 23, an image of the highway the vehicle 12 is currently traveling on. Consider, for example, a case in which the vehicle 12 is traveling on a highway 50 illustrated in FIG. 4. The highway 50 includes a first lane 51, a second lane 52, and a third lane 53. The first lane 51 and the second lane 52 are demarcated by a demarcation line 50A, and the second lane 52 and the third lane 53 are demarcated by a demarcation line 50B. An arrow DR illustrated in FIG. 4 indicates a progression direction of the vehicle 12. As illustrated in FIG. 5, for such a situation the highway image 30 displayed on the display device 23 includes a first lane image 31, a second lane image 32, and a third lane image 33. The first lane image 31 and the second lane image 32 are demarcated by a demarcation line image 30A, and the second lane image 32 and the third lane image 33 are demarcated by a demarcation line image 30B. Note that in the present exemplary embodiment, as illustrated in FIG. 5 and FIG. 6, an image displayed on the display device 23 is displayed as an image when viewed from a virtual view point (omitted in the drawings) directly above the vehicle 12 and looking obliquely downward and forward.

Moreover, when the LCA execution condition is not established, the image display control section 263 utilizes camera images (image data) representing imaging subjects at positions in the surroundings of the vehicle 12 as acquired by the camera 21A and the surrounding monitoring camera group and utilizes a pattern matching method to determine whether or not there is a surrounding vehicle at a position in the surroundings of the vehicle 12 in these camera images. Note that such a surrounding vehicle is not limited to being a four-wheeled vehicle, and may be a three-wheeled or two-wheeled vehicle. The image display control section 263 furthermore acquires image data representing the surrounding vehicle from the first data when determined that there is a surrounding vehicle included in the camera images. The image data included in the first data of the present exemplary embodiment is car image data representing a four-wheeled car, and truck image data representing a four-wheeled truck. For example, consider a situation in which, for example as illustrated in FIG. 4, the vehicle 12 and cars (other-vehicles) 55A, 55B, which are two surrounding vehicles at positions in front of the vehicle 12, are traveling in the second lane 52, a two-wheeled vehicle (other-vehicle) 55C that is another surrounding vehicle is traveling in the first lane 51, and a truck (other-vehicle) 55D that is another surrounding vehicle is traveling in the third lane 53. In such a situation the image display control section 263 ascertains the relative positions of each of the surrounding vehicles with respect to the vehicle 12 based on detection results of the sensor group and camera images. Based on these relative positions, the image display control section 263 also, as illustrated in FIG. 5, displays car image data 35A, 35B, 35C and truck image data 35D representing each of the surrounding vehicles on the display device 23. The colors of the car image data 35A, 35B, 35C and the truck image data 35D are a particular color. For example, the car image data 35A, 35B, 35C and the truck image data 35D are white. This means that the car image data 35A, 35B, 35C and the truck image data 35D are, for example, displayed as white images on the display device 23. Thus when the LCA execution condition has not been established, images (the car image data 35A, 35B, 35C and the truck image data 35D) are displayed on the display device 23 in different colors and shapes to the actual colors and shapes of the surrounding vehicles.

However, when the LCA execution condition has been established, the image display control section 263 utilizes the camera images and a pattern matching method to determine whether or not there are surrounding vehicles included in the camera images. Moreover, the image display control section 263 selects vehicle related data representing each of the surrounding vehicles from second data when determination has been made that there is a surrounding vehicle in these camera images. The second data includes vehicle related data in relation to multiple four-wheeled vehicles, three-wheeled vehicles, and two-wheeled vehicles manufactured by various Japanese and foreign vehicle manufacturers. The vehicle related data includes image data representing a shape of each vehicle and specification information for each vehicle (manufacturer name, vehicle model (product name), vehicle type) and the like. Note that the vehicle types referred to here include, for example, car, bus, and truck. Information expressing a type of car is also included in the vehicle type. For example, information expressing the type of car includes sedan, hatchback, and sport utility vehicle (SUV). The image display control section 263 utilizes the camera images and the pattern matching method to identify each vehicle model of the surrounding vehicles. Moreover, text information and specification information is utilized to identify the vehicle model of each of the surrounding vehicles when there is text expressing at least one out of the manufacturer name or the vehicle model of the surrounding vehicle included in the image data representing the surrounding vehicle. The image display control section 263 furthermore selects image data (vehicle related data) corresponding to the identified vehicle model from the second data.

Figure 6:
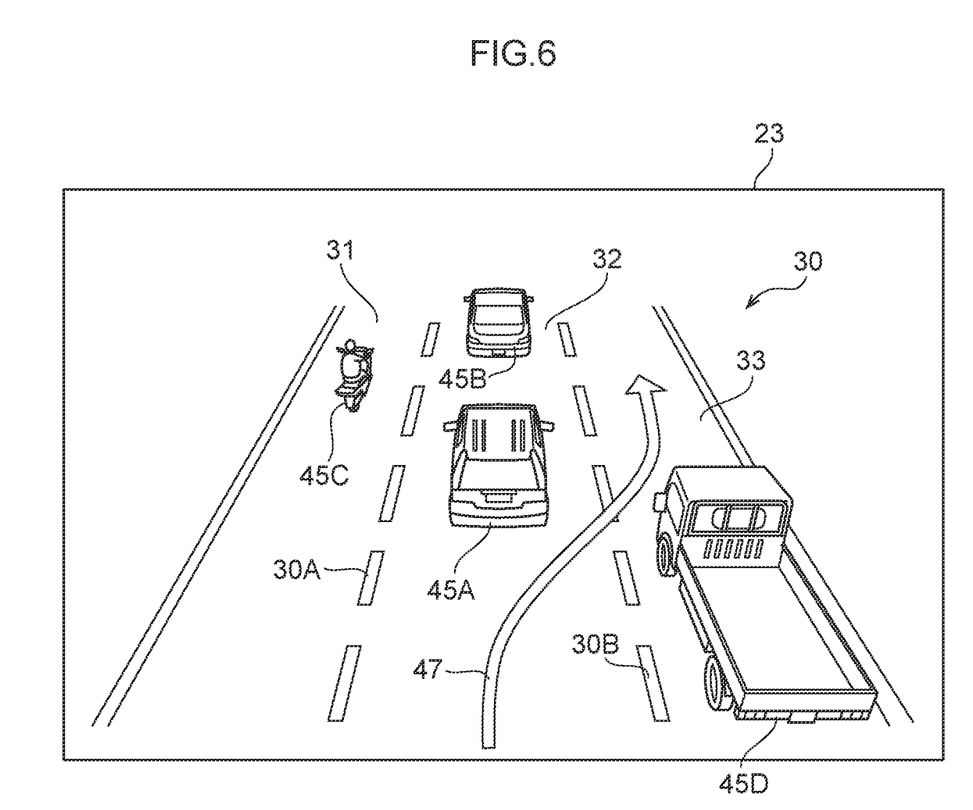
FIG. 6 is a diagram illustrating a display device displaying an image expressing a surrounding vehicle and highway when LCA is being executed.

For example, in cases in which two surrounding vehicles traveling directly ahead of the vehicle 12 are cars of mutually different vehicle models, as illustrated in FIG. 6, the image display control section 263 selects car image data (other-vehicle images) 45A, 45B representing each of the surrounding vehicles from the second data. Furthermore, in cases in which another surrounding vehicle is the two-wheeled vehicle 55C traveling in the first lane 51, the image display control section 263 selects two-wheeled vehicle image data (an other-vehicle image) 45C representing the two-wheeled vehicle 55C from the second data. Moreover, in cases in which another surrounding vehicle is the truck 55D traveling in the third lane 53, the image display control section 263 selects truck image data (an other-vehicle image) 45D representing the truck 55D from the second data.

The image display control section 263 also ascertains the color of vehicle body of any surrounding vehicles included in the camera images when the LCA execution condition has been established. For example, the image display control section 263 identifies which range of defined hues in a specific color system the hue of the color of the vehicle body of each of the surrounding vehicles falls in. This color system is, for example, a Munsell color system, an Ostwald color system, or a practical color co-ordinate system (PCCS).

For example, the image display control section 263 determines which range out of 20 ranges the hue of the vehicle body falls in for cases in which a Munsell hue wheel defined by dividing into 20 ranges is being utilized. Moreover, the image display control section 263 determines which range out of 24 ranges the hue of the vehicle body falls in for cases in which an Ostwald hue wheel defined by dividing into 24 ranges is being utilized. Moreover, the image display control section 263 determines which range out of 24 ranges the hue of the vehicle body falls in for cases in which a PCCS hue wheel defined by dividing into 24 ranges is being utilized.

For example, consider a case in which the hue of a vehicle body of the car 55A represented by the car image data 45A falls in a specific range (for example, a range including 10Y) of a Munsell hue wheel defined by dividing into 20 ranges. In such a situation the image display control section 263 appends color data including a hue falling in this range to the car image data 45A. The car image data 45A displayed on the display device 23 is accordingly represented by a color including this hue. Furthermore, consider for example a case in which a hue of a vehicle body of the two-wheeled vehicle 55C represented by the two-wheeled vehicle image data 45C falls in a specific range (for example, a range including 18:B) in a PCCS hue wheel defined by dividing into 24 ranges. In such a situation the image display control section 263 appends color data including a hue falling in this range to the two-wheeled vehicle image data 45C. The image display control section 263 performs similar processing for the car image data 45B and the truck image data 45D.

Furthermore, as illustrated in FIG. 6, based on the relative position between each of the surrounding vehicles and the vehicle 12 acquired based on a detection result of the sensor group and camera images, the image display control section 263 displays the car image data 45A, 45B, the two-wheeled vehicle image data 45C, and the truck image data 45D which represent the surrounding vehicles and are appended with the color data on the display device 23. Furthermore, the image display control section 263 reads a vehicle trajectory image 47 representing a vehicle trajectory for the vehicle 12 to execute a lane change, and displays the vehicle trajectory image 47 on the display device 23. Vehicle trajectory images of various shapes are stored on the ROM 26B or the storage 26D.

The GPS receiver 22, the display device 23, the driving assistance operation device 25, the ECU 26, the sensor group, and the actuator group are configuration elements of the vehicle control device 10.

Operation and Advantageous Effects

Next, description follows regarding the operation and advantageous effects of the present exemplary embodiment.

Next, description follows regarding processing executed by the CPU 26A of the ECU 26. The CPU 26A repeats execution of the processing of the flowchart illustrated in FIG. 7 each time the specific period of time elapses.

Figure 7:
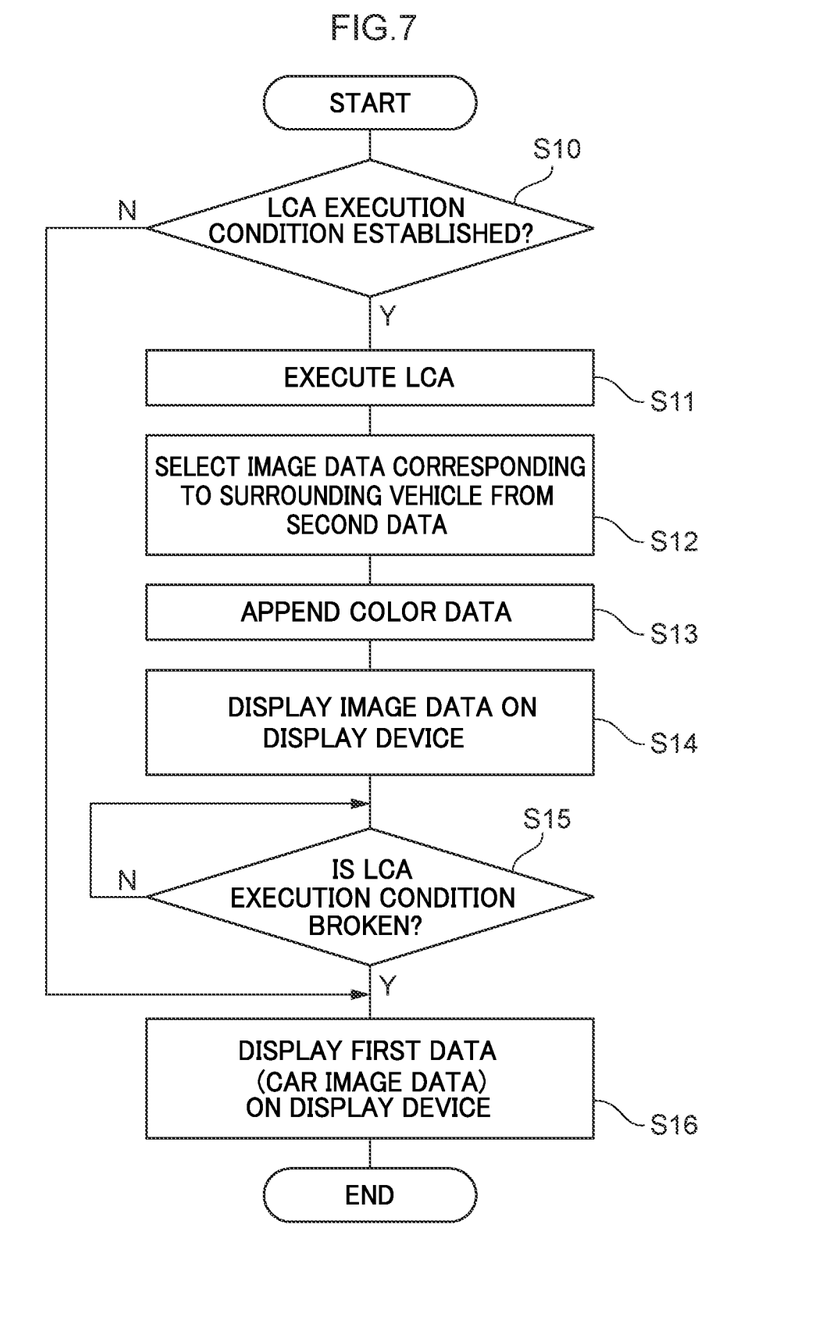
FIG. 7 is a flowchart illustrating processing executed by a CPU of an ECU.

At step S10 ("step" will be omitted hereafter), the CPU 26A determines whether or not the LCA execution condition is established.

The CPU 26A proceeds to S11 in cases in which determination was YES at S10 and executes LCA.

Next, the CPU 26A proceeds to S12 and selects image data corresponding to the surrounding vehicles from the second data. For example, in cases in which the vehicle 12 is traveling on the highway 50, the CPU 26A selects the car image data 45A, 45B, the two-wheeled vehicle image data 45C, and the truck image data 45D from the second data.

The CPU 26A proceeds to S13 when the processing of S12 has ended, and decides a hue of the color of the vehicle body of each of the surrounding vehicles based on the specific color system. Furthermore, the CPU 26A appends respective color data corresponding to the decided hues to the car image data 45A, 45B, the two-wheeled vehicle image data 45C, and the truck image data 45D selected at S12.

The CPU 26A proceeds to S14 when the processing of S13 has finished, and displays the car image data 45A, 45B, the two-wheeled vehicle image data 45C, and the truck image data 45D that have been appended with the color data on the display device 23.

The CPU 26A proceeds to S15 when the processing of S14 is finished and determines whether or not the LCA execution condition is broken.

The CPU 26A proceeds to S16 in cases in which YES was determined at S15 or NO was determined at S10, and displays first data on the display device 23 instead of the second data.

The CPU 26A temporarily ends the processing of the flowchart of FIG. 7 when the processing of S16 has finished.

In the present exemplary embodiment as described above, when the vehicle 12 is executing LCA, the car image data 45A, 45B, the two-wheeled vehicle image data 45C, and the truck image data 45D are displayed at the display device 23 so as to express each of the surrounding vehicles, traveling in the surroundings of the vehicle 12, in their respective specific colors and shapes. Namely, the colors and shapes of the car image data 45A, 45B, the two-wheeled vehicle image data 45C, and the truck image data 45D displayed on the display device 23 are the same as the actual colors and shapes of each of the respective surrounding vehicles.

In the present specification, reference to the color of the image data representing a surrounding vehicle displayed on the display device 23 being the same color as the actual color of the surrounding vehicle means that both colors are either exactly the same as each other, or that both colors are the substantially the same as each other. The two colors are exactly the same in cases in which the hue, brightness, and saturation of both are the same as each other. Both colors are substantially the same as each other when the hues of both are substantially the same as each other. For example, as described above, both colors are substantially the same in cases in which the hues of both fall in the same range in a specific hue wheel. In such cases in which both colors are either exactly the same as each other or both colors are substantially the same as each other, an occupant of the vehicle 12 who has visually checked the surroundings of the vehicle 12 and looked at surrounding image data representing the surrounding vehicles displayed on the display device 23 is readily able to ascertain correspondence relationships between the actual surrounding vehicles and the surrounding image data representing the surrounding vehicles.

Moreover in the present specification, reference to a shape of the image data representing a surrounding vehicle displayed on the display device 23 being the same as the shape of the actual surrounding vehicle means either that both shapes are completely homothetic to each other, or that both shapes are substantially homothetic to each other. In such cases in which both shapes are completely homothetic to each other or both shapes are substantially homothetic to each other, the occupant of the vehicle 12 who has visually checked the surroundings of the vehicle 12 and who has looked at surrounding image data representing the surrounding vehicles displayed on the display device 23 is readily able to ascertain correspondence relationships between the actual surrounding vehicles and the surrounding image data representing the surrounding vehicles.

The vehicle control device 10 of the present exemplary embodiment accordingly makes it unlikely that the occupant who has looked at the display device 23 during LCA execution would perceive a mismatch between the surrounding situation of the vehicle 12, as displayed on the display device 23, and the actual surrounding situation. This accordingly reduces a concern that the occupant who has looked at the display device 23 during LCA execution might feel unsettled.

Moreover, when LCA (particular driving assistance control) is being executed, the colors and shapes of images (the car image data 45A, 45B and the like) expressing the surrounding vehicles as displayed on the display device 23 are switched over to colors and shapes that are the same as those of the actual surrounding vehicles. The occupant who has looked at the display device 23 is accordingly readily able to ascertain that the vehicle 12 that was not previously executing LCA has now started to execute LCA.

Although the vehicle control device 10, the vehicle control method, and the non-transitory recording medium according to the exemplary embodiment have been described above, appropriate design changes may be made thereto within a range not departing from the spirit of the present disclosure.

Figure 8:
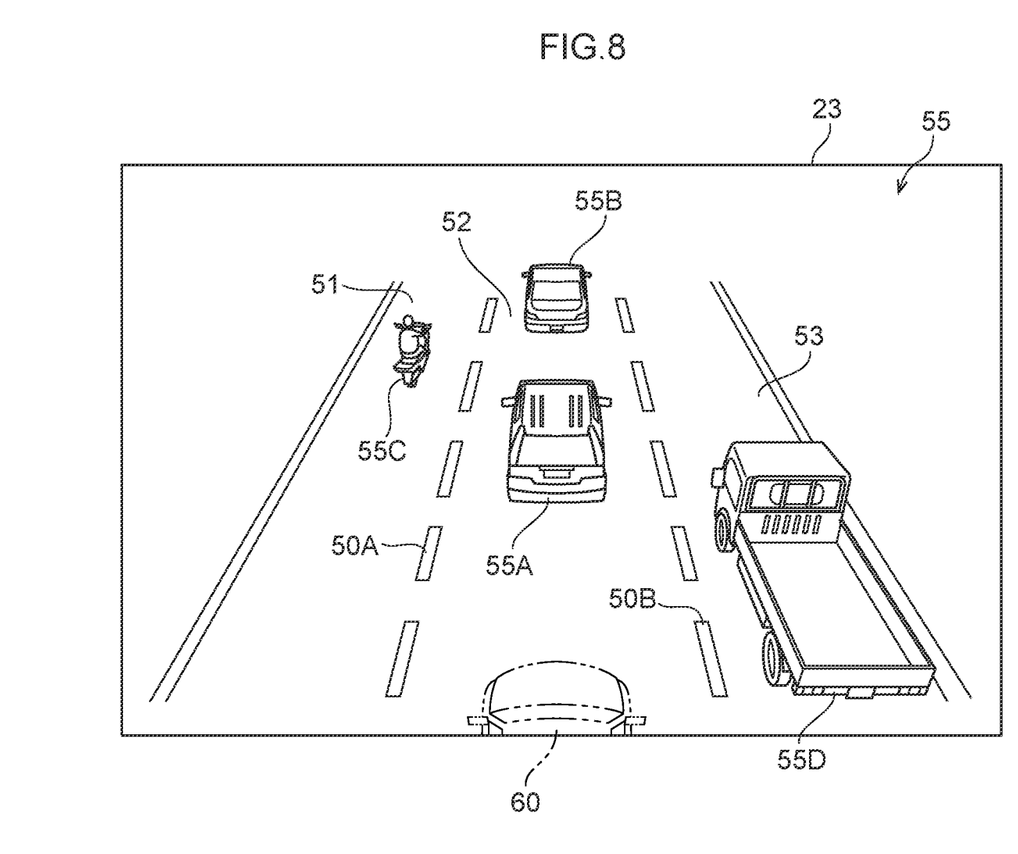
FIG. 8 is a diagram similar to FIG. 6 for a modified example.

As illustrated for example in FIG. 8, when the LCA execution condition has been established, a camera image 55 showing other-vehicle images (the cars 55A, 55B, the two-wheeled vehicle 55C, and the truck 55D), which are imaging subjects ahead of the vehicle 12 and are acquired using at least one from out of the camera 21A and the surrounding monitoring camera group, may be displayed on the display device 23. In such cases, the colors and shapes of the surrounding vehicles 55A, 55B, 55C, 55D displayed on the display device 23 will be completely the same as those of the actual surrounding vehicles 55A, 55B, 55C, 55D when the vehicle 12 is executing LCA. This means that there is a further reduction in concern that the occupant who has looked at the display device 23 during LCA execution would perceive a mismatch between the surrounding situation of the vehicle 12, as expressed by the image being displayed on the display device 23, and the actual surrounding situation. This accordingly reduces a concern that the occupant who has looked at the display device 23 during LCA execution might feel unsettled.

Moreover in such cases, a vehicle image 60 representing at least part of the vehicle 12 may be displayed on the display device 23, as illustrated in FIG. 8. The vehicle image 60 may, for example, be a camera image (image data) acquired by the camera 21A. Moreover, the vehicle image 60 may be image data stored on the ROM 26B or the storage 26D. By displaying the vehicle image 60 on the display device 23 in this manner, the occupant who has looked at the display device 23 is able to ascertain the positional relationship between the vehicle 12 and the surrounding vehicles. This accordingly reduces a concern that the occupant who has looked at the display device 23 during LCA execution might feel unsettled compared to cases in which the vehicle image 60 is not displayed on the display device 23.

The image displayed on the display device 23 may be an image representing a plan view.

What is claimed is:

1. A vehicle control device comprising a processor installed at a vehicle configured to execute driving assistance control, wherein the processor is configured to:

display, at a display device provided at the vehicle, an image representing an other-vehicle traveling in surroundings of the vehicle, the image being generated based on surrounding information including information related to the other-vehicle, wherein the display device displays the image representing the other-vehicle with a predetermined color before a predetermined type of the driving assistance control is executed; and switch a color of the image from the predetermined color to a same color as that of the other-vehicle in a case in which the vehicle is executing the predetermined type of the driving assistance control.

2. The vehicle control device of claim 1, wherein the processor is further configured to display the image with a same shape as that of the other-vehicle, at the display device, in a case in which the vehicle is executing the predetermined type of the driving assistance control.

3. The vehicle control device of claim 1, wherein, as the image, the processor is further configured to display a camera image acquired by a camera provided at the vehicle, at the display device, in a case in which the vehicle is executing the predetermined type of the driving assistance control.

4. The vehicle control device of claim 3, wherein the processor is further configured to display an image representing the vehicle at the display device that is displaying the camera image.

5. A vehicle control method comprising:

displaying, at a display device provided at a vehicle, an image representing an other-vehicle traveling in surroundings of the vehicle, the image being generated based on surrounding information including information related to the other-vehicle, wherein the display device displays the image representing the other-vehicle with a predetermined color before a predetermined type of a driving assistance control is executed; and switching a color of the image from the predetermined color to a same color as that of the other-vehicle in a case in which the vehicle is executing the predetermined type of the driving assistance control.

6. A non-transitory computer-readable medium storing instructions that, when executed by a processor, cause the processor to:

display, at a display device provided at a vehicle, an image representing an other-vehicle traveling in surroundings of the vehicle, the image being generated based on surrounding information including information related to the other-vehicle, wherein the display device displays the image representing the other-vehicle with a predetermined color before a predetermined type of a driving assistance control is executed; and switch a color of the image from the predetermined color to a same color as that of the other-vehicle in a case in which the vehicle is executing the predetermined type of the driving assistance control.

* * * * *